United States Patent
Schneider (10) Patent No.: US 9,598,042 B2
(45) Date of Patent: Mar. 21, 2017

(54) SAFETY RESTRAINT SYSTEM WITH INFLATABLE PELVIS RESTRAINT DEVICE

(71) Applicant: Autoliv ASP, Inc., Ogden, UT (US)

(72) Inventor: David W. Schneider, Waterford, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/824,227

(22) Filed: Aug. 12, 2015

(65) Prior Publication Data
US 2017/0043740 A1    Feb. 16, 2017

(51) Int. Cl.
*B60R 21/231*    (2011.01)
*B60R 21/207*    (2006.01)

(52) U.S. Cl.
CPC .......... *B60R 21/231* (2013.01); *B60R 21/207* (2013.01)

(58) Field of Classification Search
CPC ............................ B60R 21/231; B60R 21/207
See application file for complete search history.

(56) References Cited

U.S. PATENT DOCUMENTS

| | | | | |
|---|---|---|---|---|
| 5,575,497 A | * | 11/1996 | Suyama | B60R 21/231 280/730.1 |
| 5,630,616 A | * | 5/1997 | McPherson | B60R 21/207 280/728.2 |
| 6,029,993 A | * | 2/2000 | Mueller | B60R 21/23138 280/730.2 |
| 6,715,788 B2 | | 4/2004 | Saiguchi et al. | |
| 7,086,663 B2 | * | 8/2006 | Honda | B60R 21/207 280/730.2 |
| 7,198,288 B2 | * | 4/2007 | Kim | B60R 21/207 280/730.2 |
| 8,585,078 B1 | * | 11/2013 | Witt, Jr. | B60R 21/207 280/728.2 |
| 8,882,138 B1 | * | 11/2014 | Hicken | B60R 21/231 280/730.1 |
| 2001/0011810 A1 | * | 8/2001 | Saiguchi | B60N 2/4221 280/728.1 |
| 2003/0160433 A1 | * | 8/2003 | Kumagai | B60R 21/233 280/729 |
| 2004/0046375 A1 | * | 3/2004 | Lincoln | B60R 21/231 280/743.1 |
| 2004/0178616 A1 | * | 9/2004 | Yoshikawa | B60N 2/4221 280/748 |
| 2005/0189752 A1 | * | 9/2005 | Itoga | B60R 21/231 280/741 |

(Continued)

FOREIGN PATENT DOCUMENTS

JP    2008296722 A    12/2008

*Primary Examiner* — Darlene P Condra
(74) *Attorney, Agent, or Firm* — Stephen T. Olson; Harness, Dickey & Pierce, P.L.C.

(57) ABSTRACT

An inflatable restraint device for a vehicle seat having a lower seat cushion includes a central portion and at least one side portion. The central portion extends in a lateral direction substantially across a central seat cushion portion of the lower seat cushion and has a first width perpendicular to the lateral direction. The at least one side portion laterally protects an occupant of the vehicle seat and has a second width perpendicular to the lateral direction. The second width is greater than the first width. The at least one side portion is in fluid communication with the central portion.

16 Claims, 7 Drawing Sheets

(56) References Cited

U.S. PATENT DOCUMENTS

| | | | |
|---|---|---|---|
| 2010/0078921 A1* | 4/2010 | Ryan | B60R 21/207 280/730.2 |
| 2014/0001799 A1* | 1/2014 | Kalisz | B60R 21/207 297/216.1 |
| 2016/0059814 A1 | 3/2016 | Schneider | |
| 2016/0059818 A1 | 3/2016 | Witt et al. | |
| 2016/0059819 A1 | 3/2016 | Witt et al. | |
| 2016/0075299 A1 | 3/2016 | Wang et al. | |

* cited by examiner

SAFETY RESTRAINT SYSTEM WITH INFLATABLE PELVIS RESTRAINT DEVICE

FIELD

The present disclosure relates to safety restraint systems. More particularly, the present disclosure relates to a safety restraint system having an inflatable restraint device with a pelvis restraint portion and at least one inflatable lateral portion.

BACKGROUND

This section provides background information related to the present disclosure which is not necessarily prior art.

Various passive and active automotive occupant restraint systems are known for enhancing occupant protection in the event of a vehicle impact. Passive systems are deployed with no action required by the occupant and include inflatable restraints or airbags for frontal and side impacts, for example. Automatically deployed seat belt systems are also known. Active systems, such as seat belts, have been used for many decades and are manually deployed by the occupant.

Conventional seat belt systems use three points of connection with the vehicle structure and incorporate a lap belt portion for engaging the occupant's lower torso and a shoulder belt portion for engaging the occupant's upper torso. When used, the seat belt restrains movement of the occupant in the event of a vehicle impact or rollover event. In order to enhance the comfort and convenience provided by the seat belt system, retractors are used which permit belt webbing to be extracted from and retracted into the retractor, allowing movement of the occupant while maintaining the belt in close contact with the occupant.

A more recent development in the area of passive restraints relates to pelvis restraint. An inflatable device may be disposed below a seat cushion. The device may be activated upon sensing predetermined dynamic characteristics of the vehicle (e.g., an actual or impending impact or rollover event. The airbag generally applies an upward directed force to the seat cushion and may restrain the pelvis of a seat occupant from forward movement. Commonly owned U.S. Ser. No. 14/470,001 filed 27 Aug. 2014 teaches an inflatable pelvis restraint device having a flexible member extending laterally across the seat cushion and having a first end and a second end. The flexible member includes at least a portion that is inflatable for increasing a height of the seat proximate a forward edge of the seat. In one embodiment, both the first and second ends are attached to the frame. U.S. Ser. No. 14/470,001 is incorporated by reference as if fully set forth herein.

While known safety restraint systems have generally proven to be acceptable for their intended uses, a continuous need for improvement exists in the relevant art.

SUMMARY

This section provides a general summary of the disclosure, and is not a comprehensive disclosure of its full scope or all of its features.

In accordance with one aspect, the present teachings provide an inflatable restraint device for a vehicle seat having a lower seat cushion. The inflatable restraint device has a central portion and at least one side portion. The central portion extends in a lateral direction substantially across a central seat cushion portion of the lower seat cushion and has a first width perpendicular to the lateral direction. The at least one side portion laterally protects an occupant of the vehicle seat and has a second width perpendicular to the lateral direction. The second width is greater than the first width. The at least one side portion is in fluid communication with the central portion.

In accordance with another aspect, the present teachings provide a safety restraint system in combination with a vehicle seat. The safety restraint system includes a seat and an inflatable restraining [DS1] device. The seat includes [DS2] a frame, a seat back and a seat cushion supported on the frame. The inflatable restraint device includes a pelvis restraining portion disposed within the seat and has a length laterally extending across a central portion of the cushion seat. The inflatable restraint device further includes at least one inflatable side portion. The pelvis restraining portion has a first width perpendicular to the length and a second width perpendicular to the length. The second width is greater than the first width.

In accordance with yet another aspect, the present teachings provide a method of protecting an occupant of a vehicle seat. The vehicle seat includes a seat cushion. The method includes providing an inflatable restraint device central section with a length extending laterally across a central portion of the seat cushion. The method additionally [DS3] includes inflating the central section to increase a seat height proximate a forward edge of the seat cushion. The method further includes inflating at least one side portion of the inflatable restraint device to upwardly extend from the central section lateral to a pelvis of the occupant.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail.

With initial reference to FIGS. 1 through 5, a restraint system constructed in accordance with the present teachings is illustrated and generally identified at reference character 10. The restraint system 10 is shown operatively associated with a seat 12 of a motor vehicle. It will be understood that the particular seat 12 illustrated is merely exemplary. In this regard, the present teachings may be adapted to various other seats. For example, the present teachings may be adapted for use in front or rear seats in motor vehicles. The present teachings may also be adapted for use in aviation and other seating environments.

Except as otherwise described herein, it will be understood that the seat 12 shown throughout the drawings is conventional in construction. Briefly, the seat 12 is illustrated to generally include a lower seat cushion 14, an upwardly extending seat back 16 and a headrest 18. The lower seat cushion 14 may include a central seat cushion portion 14A and first and second bolster portions 14B disposed on opposite lateral sides of the central seat cushion portion 14A.

The restraint system 10 is illustrated to generally include a seat belt system 20 and an inflatable restraint device or air bag cushion 22. In this embodiment, it will be understood that the seat belt system 20 and the inflatable pelvis restraint device 22 cooperate with one another but are otherwise independent from each other. The seat belt system 20 generally includes a webbing 24 having an upper shoulder belt portion 26 and a lower lap belt portion 28. The shoulder belt portion 26 may pass through a "D" ring 30 which is typically mounted to the "B" pillar of the motor vehicle (the vertical structural member separating the front and rear doors of a four-door vehicle). A seat belt latch plate or tongue 32 is slidably carried by the seat belt webbing 24 and is received by a seat belt buckle (not shown). The seat belt buckle may be attached to the vehicle floor pan or the seat 12 in a conventional manner. In a conventional manner, a first free end of the webbing 24 may be anchored to the seat 12 or floor pan of the vehicle and a second free end of the webbing 24 may be associated with a retractor. One suitable retractor is shown and described in commonly assigned U.S. Pat. No. 7,607,687. U.S. Pat. No. 7,607,687 is hereby incorporated by reference as if fully set forth herein.

In the embodiment illustrated, the inflatable restraint device 22 will be understood to be a single inflatable member inflatable by an inflator 34. The inflatable restraint device 22 will be understood to be flexible. By describing the inflatable restraint device 22 as flexible, it will be understood that the inflatable restraint may be constructed of a flexible material (i.e., a material that is not shape retaining) such as a woven material. For example, a webbing of the inflatable restraint device 22 may be woven from conventional materials suitable for airbags. In the embodiments herein, the inflatable restraint device 22 does not include any memory retaining materials, such as metal or the like.

Figure 4:
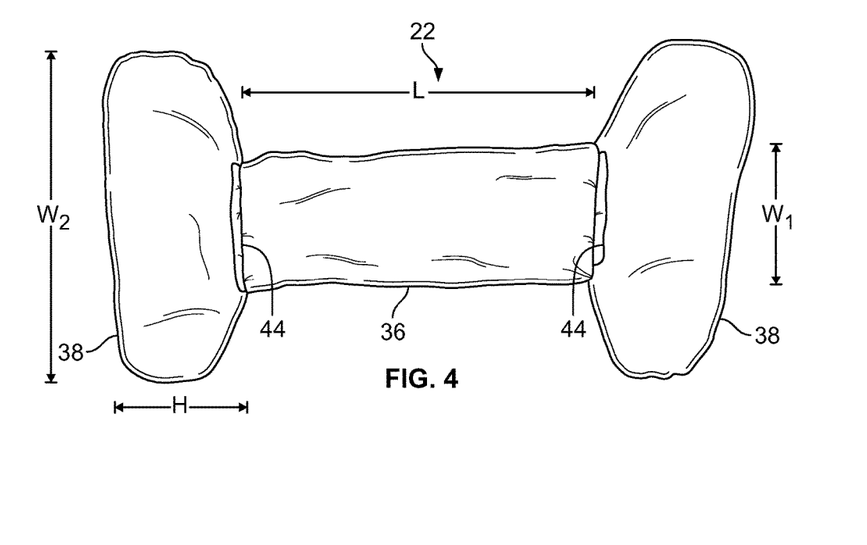
FIG. 4 is a top view of the inflatable restraint device of FIG. 1, the inflatable restraint device shown prior to inflation and removed from the seat for purposes of illustration.
Figure 5:
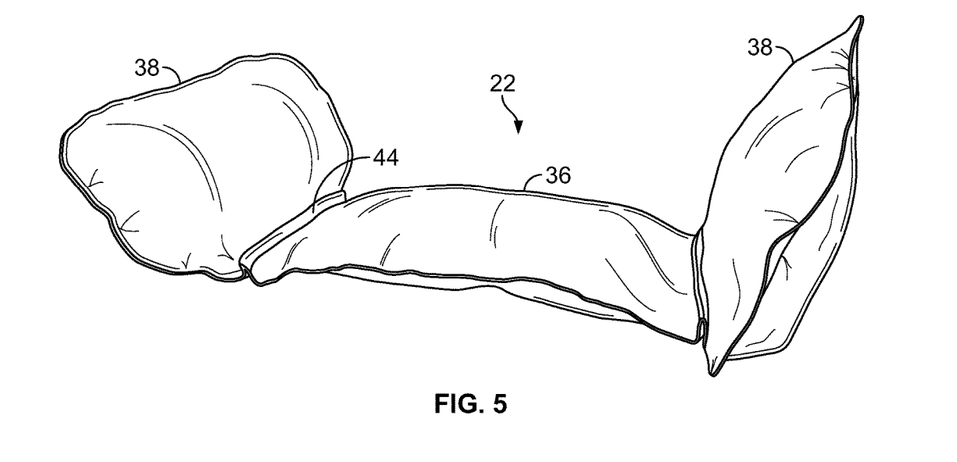
FIG. 5 is a perspective view of the inflatable restraint device of FIG. 1, again shown removed from the seat for purposes of illustration, the inflatable restraint shown after inflation.

With particular reference to FIGS. 4 and 5, the inflatable restraint device 22 is illustrated to generally include a central section 36 and at least one side section 38. In the embodiment illustrated, the inflatable restraint device 22 includes first and second side sections or lateral sections 38. Upon inflation, the central section 36 provides support and lift to the legs of a seat occupant 40. The central section 36 also provides gas communication between the first and second side sections 38.

The central section 36 may extend at least substantially across a lateral width of the central seat cushion portion 14A of the seat 12. The central section 36 of the inflatable restraint device 22 may be located within the foam of the central seat cushion portion 14A of the seat 12. In this regard, the central section 36 may be disposed within a channel or slot defined in the cushion portion 14A. Alternatively, the central section 36 may be located below the cushion portion 14A or between the cushion portion 14A and a seat cover material. In any event, the central section 36 may be positioned proximate a forward edge of the seat 12 such that the inflatable restraint device 22 functions to increase a height of the seat 12 proximate the forward edge upon inflation.

Upon inflation of the inflatable restraint device 22, the first and second side sections 38 deploy from the seat 12 and provide a degree of lateral protection to the occupant of the seat 12. In this regard, the first and second side sections 38 may provide lateral protection to the pelvis of the occupant 40. As adapted to the seat 12 shown throughout the drawings, the first and second side sections 38 may be stored within the first and second bolster portions 14B, respectively. The inflatable restraint device 22 may be similarly used with seats that do not include side bolster portions.

In the particular application illustrated, the central section 36 of the inflatable restraint device 22 may have a length L in a cross-car direction of approximately 350 mm and a width $W_1$ perpendicular thereto of approximately 150 mm. The first and second side sections 38 may have a width $W_2$ greater than the width $W_1$ of the central section 36. In some embodiments, the first and second side sections may have a width $W_2$ substantially greater than the width $W_1$ of the central section 36. In various embodiments, the first and second side sections 38 may have a width $W_2$ at least twice the dimension of the width $W_1$ of the central section 36 [DS4].

The width $W_2$ of the first and second side sections 38 may be greater than a deployable height of H of the first and second side sections 38. In some embodiments, the width $W_2$ of the first and second side sections may be substantially greater than the deployable height H. In various embodiments, the width $W_2$ of the first and second side sections 38 may be at least twice the dimension of the deployable height H. In this particular application shown, the first and second side sections 38 may have a width $W_2$ of approximately 350 mm and a deployable height H of approximately 150 mm. As used herein, the "deployable height" will be understood to be measured from a junction 44 between the central section 36 and the respective side section 38 across the respective side section 38. Upon deployment, central section 36 of this particular application may have a depth of approximately 95 mm and the first and second side sections 38 may each have a maximum thickness (in a cross-car direction) of approximately 95 mm.

As will become more apparent below, the first and second side sections 38 may exit the seat 12 through tear seams 42. The tear seams 42 may be located between the central seat cushion portion 14A and the first and second side bolster portions 14B. Alternatively, the tear seams 42 may be provided in any other suitable location to facilitate deployment of the first and second side sections 38.

The present teachings may be adapted for use with any inflator 34 capable of supplying a source of gas to the inflatable restraint device 22 in response to sensing of a predetermined vehicle condition. Suitable inflators are commercially available from the assignee of this application. A vehicle restraint system controller (not shown) may automatically send signals to actuate the inflator 34 to inflate the inflatable restraint device 22. Details of the inflator 34 and the vehicle restraint system controller are beyond the scope of the present teachings and will be readily apparent to those of ordinary skill in the art.

Figure 1:
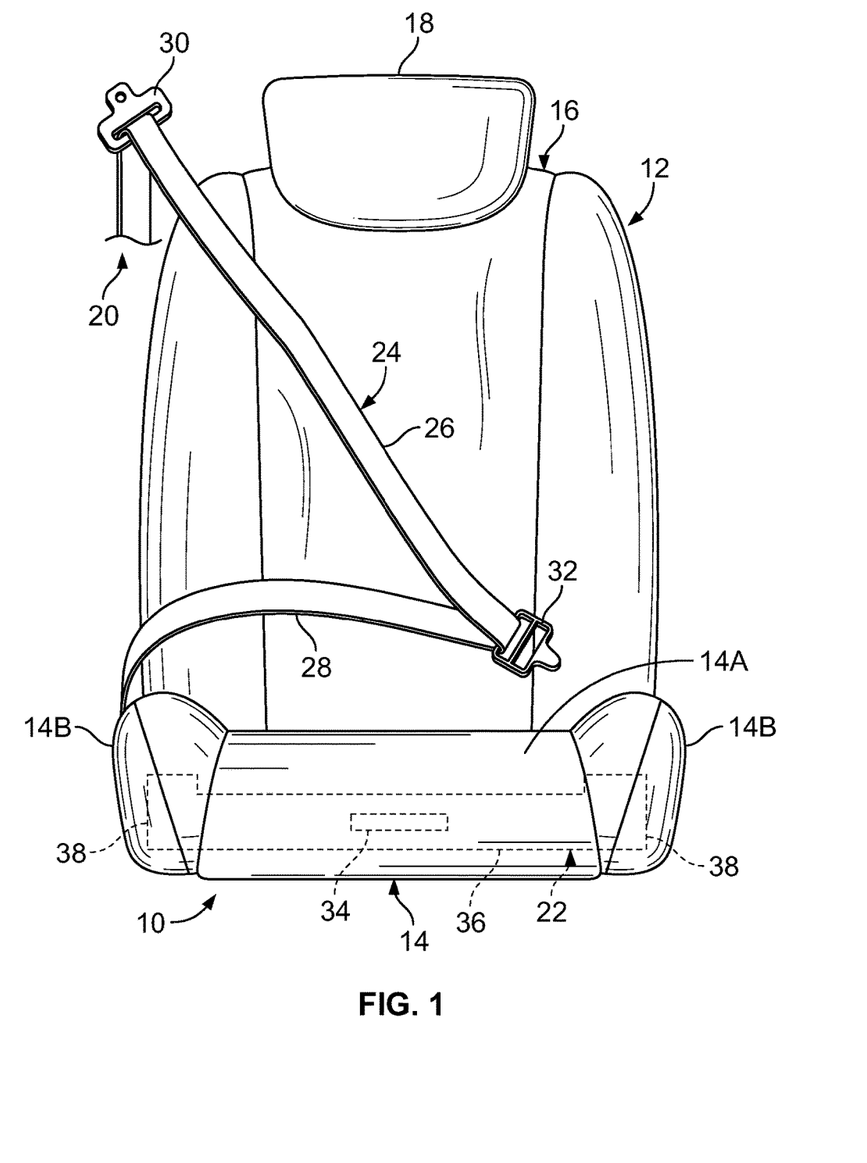
FIG. 1 is a front view of a restraint system in accordance with the present teachings and including an inflatable restraint device, the restraint system shown operatively associated with a vehicle seat prior to inflation.
Figure 2:
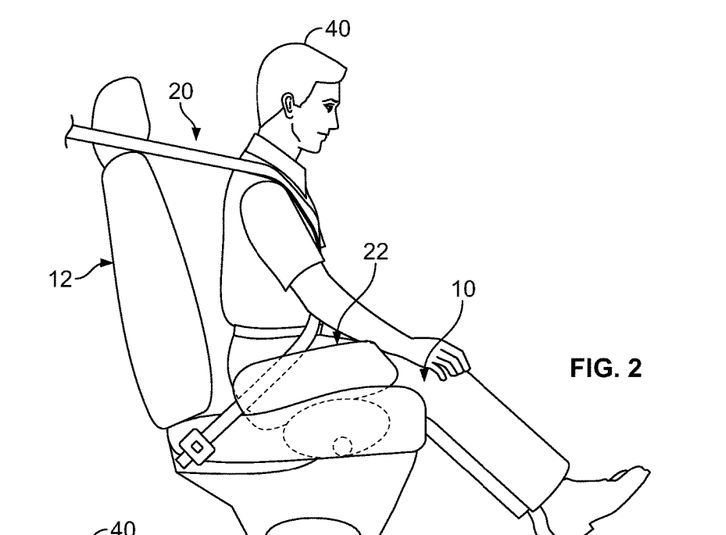
FIG. 2 is a side view of the restraint system and seat of FIG. 1, the inflatable restraint device shown inflated and restraining a seat occupant.
Figure 3:
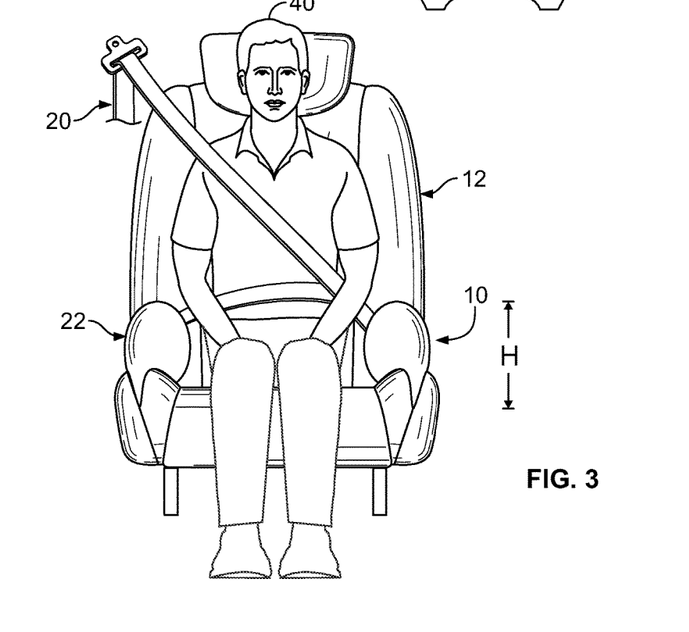
FIG. 3 is a front view of the inflatable restraint system and seat as shown in FIG. 2.

Upon sensing of a predetermined vehicle condition, the vehicle restraint system controller actuates the inflator 34 to inflate the inflatable restraint device 22. A non-activated or uninflated condition of the inflatable restraint device 22 is shown in FIGS. 1 and 4. An actuated or inflated condition of the inflatable restraint device 22 is shown in FIGS. 2, 3 and 5.

With reference to the simplified cross-sectional views FIGS. 6A-6D, various alternative packaging locations and fold patterns for the inflatable restraint device 22 are shown. The combination of location, stored configuration (rolled, folded, etc.) and tear seam location may be used to control deployment trajectory for the side sections 38 of the inflatable restraint device 22. The intended trajectories are indicated in the drawings of FIGS. 6A-6D at arrows D. The side sections 38 are deployable to an orientation generally perpendicular to both the length L and width W, of the central section 36. In other words, the first and second sections are deployable generally upwardly.

Figure 6A:
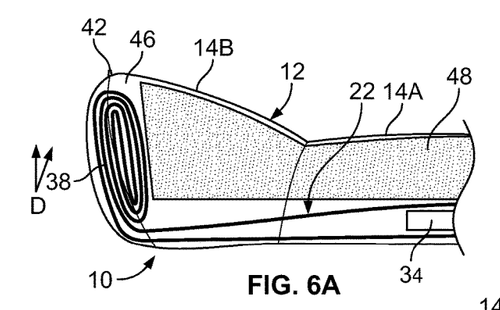
FIG. 6A-6D are simplified cross-sectional views illustrating various alternative inflatable restraint device packaging locations, tear seams and fold patterns.
Figure 6B:
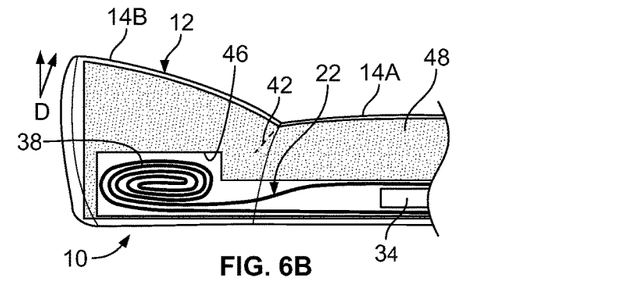
Figure 6C:
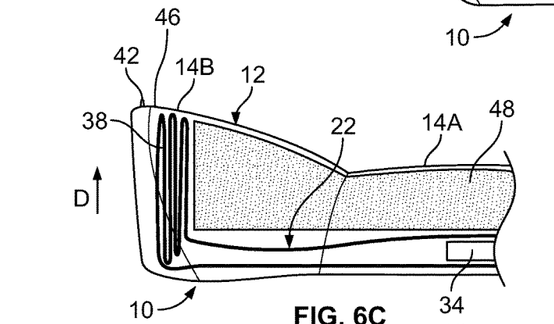
Figure 6D:
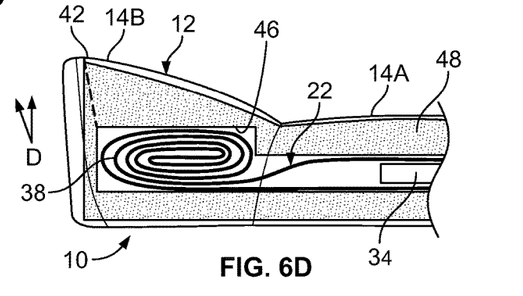

In the embodiment of FIG. 6A, the side sections 38 of the inflatable restraint device 22 are rolled and disposed within cavities 46 of the seat that are outboard of a foam cushion 48. The tear seam 42 may be positioned on an outboard portion of the upper surface of the respective side bolster portion 14B. In the embodiment of FIG. 6B, the side sections 38 of the inflatable restraint device 22 may again be rolled. In this embodiment, the side sections may be disposed within cavities 46 within the foam cushion 48. The tear seam 42 may be positioned between the central portion 14A and the respective side bolster portion 14B. In the embodiment of FIG. 6C, the side sections 38 of the inflatable restraint device 22 may be folded, using pleats, tucks, or accordion type folds. Similar to the embodiment of FIG. 6A, the side sections 38 may be disposed within cavities 46 of the seat that are outboard of the foam cushion 48. Again, the tear seam 42 may be positioned on an outboard portion of the upper surface of the respective side bolster portion 14B. In the embodiment of FIG. 6D, the side sections 38 may again be rolled and the side sections 38 may be disposed within cavities 46 in the foam cushion 48. The tear seam 42 may be positioned on an outboard portion of the upper surface of the respective side bolster portion 14B. Any combination of fold over, rolls, pleats, tucks, accordions or other folds may be utilized for folding the cushion. Alternatively, there may be no tear seams and the seat cover may stretch/expand due to inflation of the cushion inside, without tearing through the seat covering. In another alternative, the central section of the cushion may inflate and tear through the seat cover (similar to the side sections).

Figure 7A:
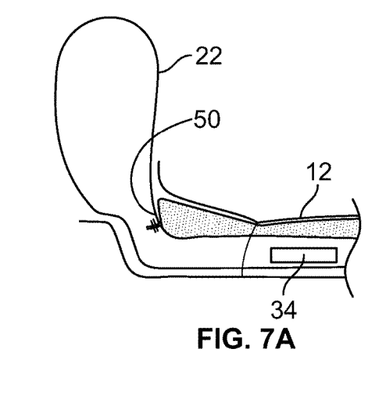
FIGS. 7A-7F are simplified views illustrating various alternative manners for controlled deployment of the inflatable restraint device of the present teachings.
Figure 7B:
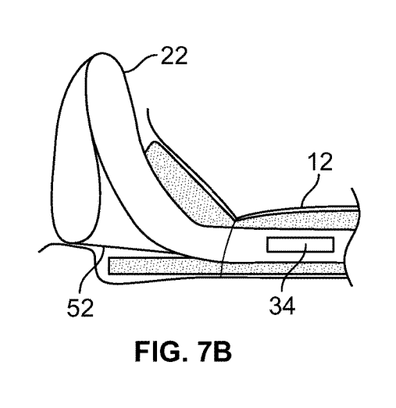
Figure 7C:
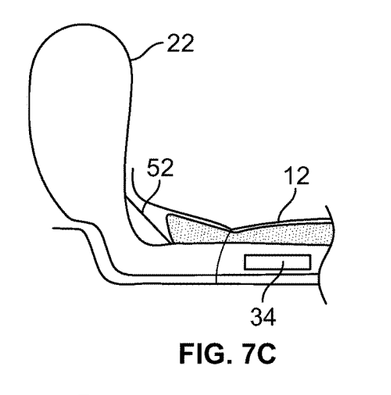
Figure 7D:
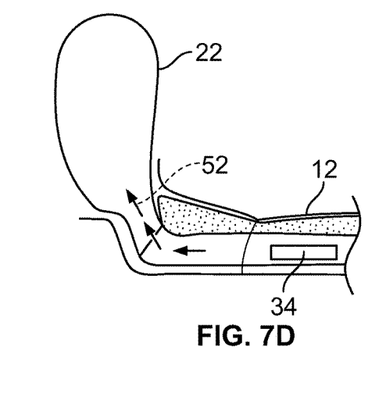
Figure 7E:
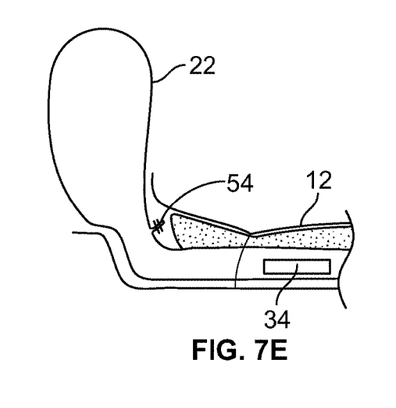
Figure 7F:
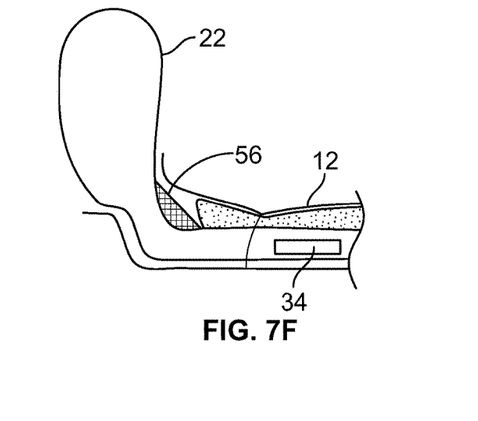

Turning now to the simplified views of FIGS. 7A-7F, various alternative manners for controlled deployment of the inflatable restraint device 22 of the present teachings are illustrated. Any one or a combination of these features may be utilized to control cushion deployment trajectory and/or shape. In the embodiment of FIG. 7A, one of the side sections 38 is shown extending through a split line or tear seam 42 in the seat 12. The inflatable restraint device 22 may include a feature for controlling deployment of the side sections 38. For example, the inflatable restraint device 22 may include an inner pleat 50 located between the central section 36 and each of the side sections 38 for controlling deployment. In the embodiment of FIG. 7B, deployment of the side sections 38 of the inflatable restraint device 22 is controlled with a tether 52. In this embodiment, the tether 52 is positioned below the inflatable restraint device 22. In the embodiment of FIG. 7C, deployment of the side sections 38 of the inflatable restraint device 22 is again controlled with a tether 52. In this embodiment, the tether 52 is positioned above the inflatable restraint device 22. In the embodiment of FIG. 7D, deployment of the side sections 38 of the inflatable restraint device 22 is controlled with an internal tether 52. In the embodiment of FIG. 7E, deployment of the side sections 38 of the inflatable restraint device 22 is controlled with an external pleat 54. In the embodiment of FIG. 7F, deployment of the side sections 38 of the inflatable restraint device 22 is controlled with a panel tether 56.

Figure 8:
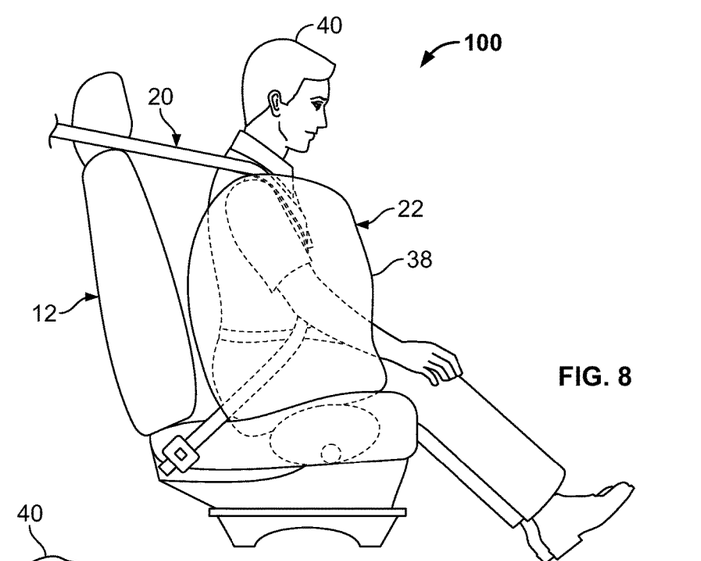
FIG. 8 is a simplified side view similar to FIG. 2, illustrating an alternative inflatable restraint in accordance with the present teachings.
Figure 9:
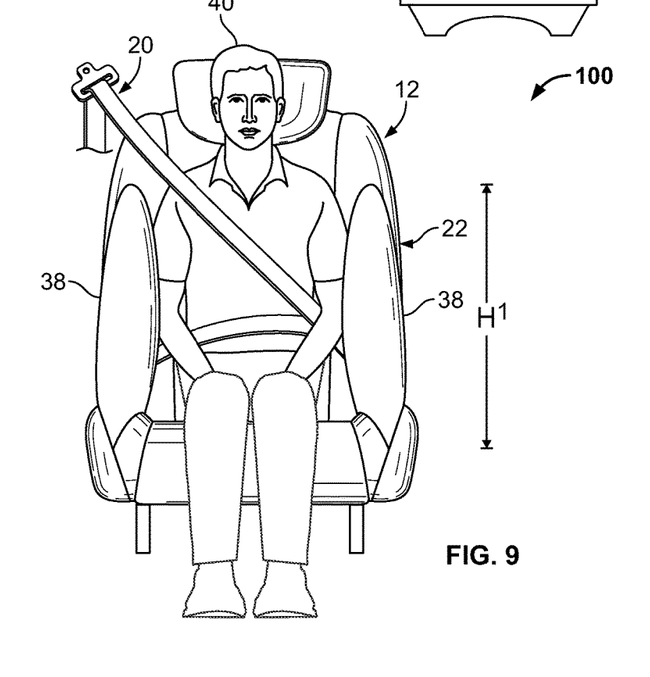
FIG. 9 is a simplified front view similar to FIG. 3, illustrating the alternative inflatable restraint device of FIG. 8.

With reference now to FIGS. 8 and 9, another restraint system constructed in accordance with the present teachings is illustrated and identified at reference character 100. As with the restraint system 10, the restraint system 100 includes a seat belt system 20 and an inflatable restraint device 22. Given the similarities between the restraint systems 10 and 100, common reference characters will be used throughout the various views to identify similar elements.

The restraint system 100 differs from the restraint system 10 in that the side portions 38 of the inflatable restraint device 22 have an increased deployable height $H^1$. The deployable height $H^1$ may be greater or substantially greater than the width $W_2$ of the first and second side sections 38. The deployed first and second side sections 38 may upwardly extend to laterally protect the occupant's pelvis and to also laterally protect the occupant's torso and arms. In the embodiment illustrated, the side portions 38 may have a deployable height $H^1$ of approximately 600 mm. Other dimensions for this embodiment may be substantially identical to the dimensions described above with regard to the restraint system 10. It will be understood that the various embodiments described above in FIGS. 6A-6D and 7A-7F are equally applicable to the restraint system 100.

Figure 10:
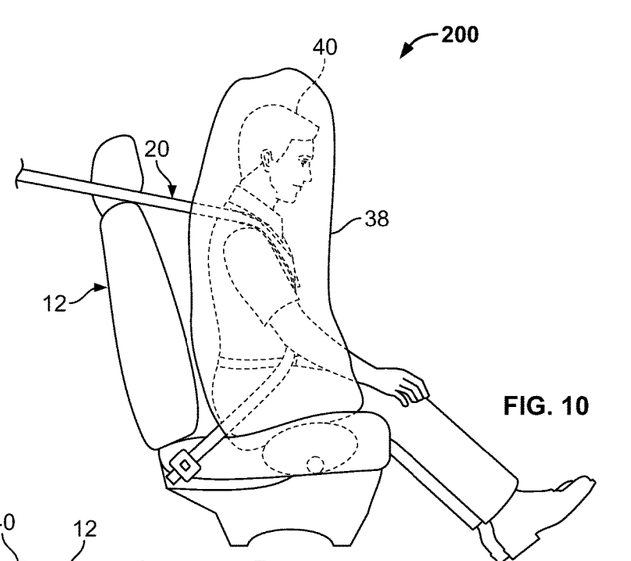
FIG. 10 is another simplified side view similar to FIG. 2, illustrating another alternative inflatable restraint device in accordance with the present teachings.
Figure 11:
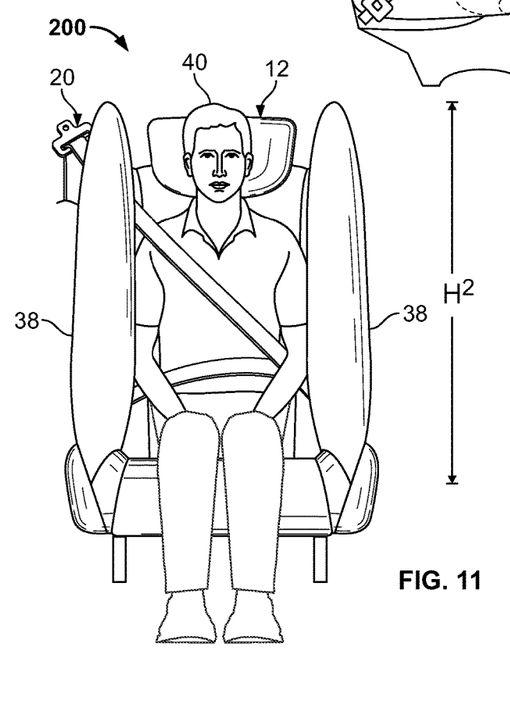
FIG. 11 is another simplified front view similar to FIG. 3, illustrating the alternative inflatable restraint device of FIG. 8.

With reference now to FIGS. 10 and 11, another restraint system constructed in accordance with the present teachings is illustrated and identified at reference character 200. As with the restraint system 10, the restraint system 200 includes a seat belt system 20 and an inflatable restraint device 22. Given the similarities between the restraint systems 10 and 200, common reference characters will be used throughout the various views to identify similar elements.

The restraint system 200 differs from the restraint system 10 in that the side portions 38 of the inflatable restraint device 22 have yet a further increased deployable height $H^2$. The deployable height $H^2$ may be greater or substantially greater than the width $W_2$ of the first and second side sections 38. In various embodiments, the deployable height $H^2$ may be at least twice as great as the width $W_2$. The deployed first and second side sections 38 may upwardly extend to not only laterally protect the occupant's pelvis, torso and arms, but also laterally protect the occupant's head. In the embodiment illustrated, the side portions 38 may have a deployable height of approximately 900 mm. Other dimensions for this embodiment may be substantially identical to the dimensions described above with regard to the restraint system 10. It will be understood that the various embodiments described above in FIGS. 6A-6D and 7A-7F are equally applicable to the restraint system 200.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An inflatable restraint device for a vehicle seat having a lower seat cushion, the inflatable restraint device comprising:
    a central portion for extending in a lateral direction substantially across a central seat cushion portion of the lower seat cushion, the central portion having a first width perpendicular to the lateral direction; and
    at least one side portion for laterally protecting an occupant of the vehicle seat, the at least one side portion having a second width perpendicular to the lateral direction and greater than the first width,
    wherein the at least one side portion is in fluid communication with the central portion, and
    the at least one side portion includes a deployable height, the deployable height being at least twice as great as the second width.

2. The inflatable restraint device of claim 1, wherein the at least one side portion includes first and second side portions.

3. The inflatable restraint device of claim 1, wherein the second width is substantially greater than the first width.

4. The inflatable restraint device of claim 1, wherein the second width is at least twice as great as the first width.

5. The inflatable restraint device of claim 1, wherein the at least one side portion includes a deployable height, the deployable height being less than the second width.

6. An inflatable restraint device for a vehicle seat having a lower seat cushion, the inflatable restraint device comprising:
    a central portion for extending in a lateral direction substantially across a central seat cushion portion of the lower seat cushion, the central portion having a first width perpendicular to the lateral direction; and
    at least one side portion for laterally protecting an occupant of the vehicle seat, the at least one side portion having a second width perpendicular to the lateral direction and greater than the first width,
    wherein the at least one side portion is in fluid communication with the central portion,
    wherein the first width is approximately 150 mm and the second width is approximately 350 mm.

7. A safety restraint system in combination with a vehicle seat comprising:
    a seat including a seat back and a seat cushion; and an inflatable restraint device including a pelvis restraining portion disposed within the seat, the inflatable restraint device having a length laterally extending across a central portion of the cushion seat, the inflatable restraint device further including at least one inflatable side portion, the pelvis restraining portion having a first width perpendicular to the length, the at least one inflatable side portion having a second width perpendicular to the length, the second width being greater than the first width, wherein the first width is approximately 150 mm and the second width is approximately 350 mm.

8. The safety restraint system of claim 7, wherein the at least one inflatable side portion includes first and second inflatable side portions.

9. The safety restraint system of claim 8, wherein the seat cushion further includes first and second side bolsters and the first and second side portions are normally stored within the first and second side bolsters, respectively, and deployable to an orientation generally perpendicular to the length and the first width.

10. The safety restraint system of claim 9, wherein the seat cushion includes first and second tear seams located on a respective outboard portion of an upper surface of the first and second side bolsters, the first and second inflatable side portions deployable through the first and second tear seams, respectively.

11. The safety restraint system of claim 8, wherein the seat cushion includes a foam cushion and defines first and second cavities on opposite lateral sides of the foam cushion, the first and second inflatable side portions stored in the first and second cavities, respectively.

12. The safety restraint system of claim 11, wherein the first and second inflatable side portions are stored in a folded condition.

13. The safety restraint system of claim 8, wherein the first and second inflatable side portions are stored in a rolled condition.

14. The safety restrict system of claim 8, wherein the seat cushion includes a foam cushion, the foam cushion defining first and second cavities, the first and second inflatable side portions normally stored in the first and second cavities, respectively.

15. The safety restraint system of claim 7, wherein the inflatable restraint device includes a feature for controlling deployment of the at least one inflatable side portion, the feature selected from a group consisting of an outer pleat, an inner pleat and a tether.

16. A method of protecting an occupant of a vehicle seat, the vehicle seat including a seat cushion, the method comprising:

providing an inflatable restraint device central section with a length extending in a lateral direction across a central portion of the seat cushion;

inflating the central section to increase a seat height proximate a forward edge of the seat cushion; and inflating at least one side portion of the inflatable restraint device to upwardly extend from the central section, the at least one side portion having a width perpendicular to the lateral direction, the inflated at least one side portion having a deployable height, the deployable height being at least twice as great as the width.

* * * * *